United States Patent [19]

Braden

[11] Patent Number: 4,765,084

[45] Date of Patent: Aug. 23, 1988

[54] FISHING LURE WITH RETRACTABLE HOOK

[76] Inventor: Daniel L. Braden, 893 North Ave. #301, Battle Creek, Mich. 49017

[21] Appl. No.: 93,504

[22] Filed: Sep. 4, 1987

[51] Int. Cl.$^4$ ................................................ A01K 83/00
[52] U.S. Cl. ............................................ 43/34; 43/42.1
[58] Field of Search ............... 43/34, 35, 36, 37, 42.1, 43/43.2, 43.4, 43.6

[56] References Cited

U.S. PATENT DOCUMENTS

| | | |
|---|---|---|
| 2,244,980 | 6/1941 | Abramson ................................ 43/37 |
| 2,459,819 | 5/1946 | Hoage . |
| 2,474,481 | 6/1949 | Kleppen et al. ........................ 43/35 |
| 2,820,314 | 1/1958 | Scott ...................................... 43/42.1 |
| 3,060,619 | 8/1960 | Cornick . |
| 3,410,019 | 7/1965 | Landi . |
| 3,665,634 | 5/1970 | Baud . |
| 3,791,064 | 4/1972 | Van Iseghem, Jr. . |
| 4,274,220 | 8/1979 | Rogers, Jr. . |

Primary Examiner—M. Jordan
Attorney, Agent, or Firm—Flynn, Thiel, Boutell & Tanis

[57] ABSTRACT

A fishing lure for trolling includes a pull member having a line attachment portion to which a fishing line can be attached, a body supported for pivotal movement relative to the pull member between first and second positions, the body and pull member normally being maintained in the first position when the lure is in use and being capable of pivoting to the second position when a fish strikes the lure, a hook part, and an arrangement which effects movement of the hook part relative to the body from a retracted position to an exposed position in response to movement of the pull member and body from the first position to the second position. The body has an arrangement which prevents aqueous weeds from snagging the hook part when the hook part is in its retracted position, and the hook part projects outwardly from the body when in its exposed position so as to be capable of hooking a fish.

15 Claims, 4 Drawing Sheets

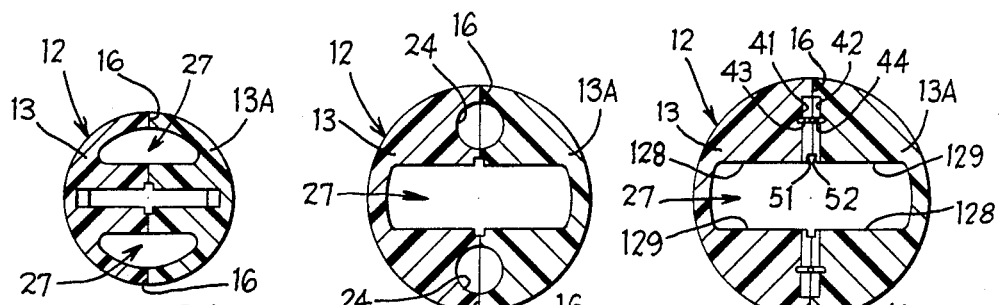
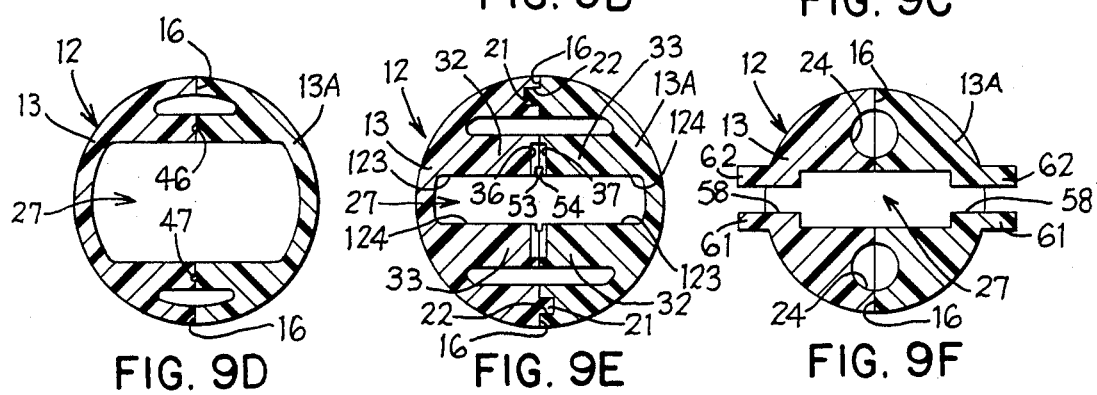
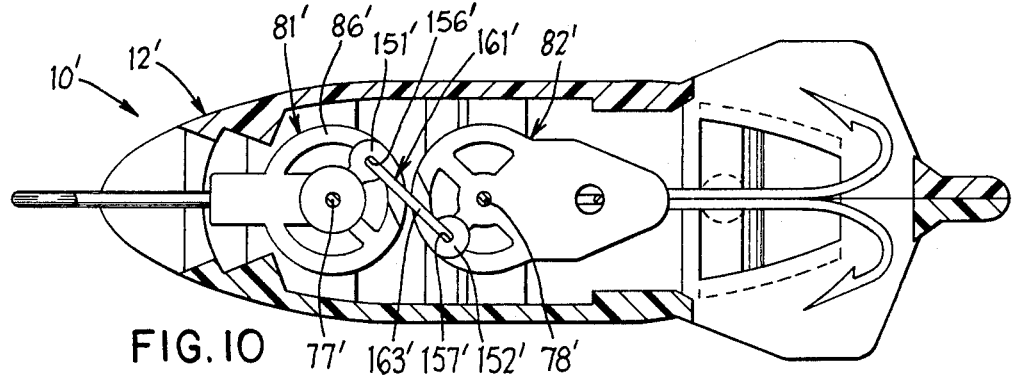
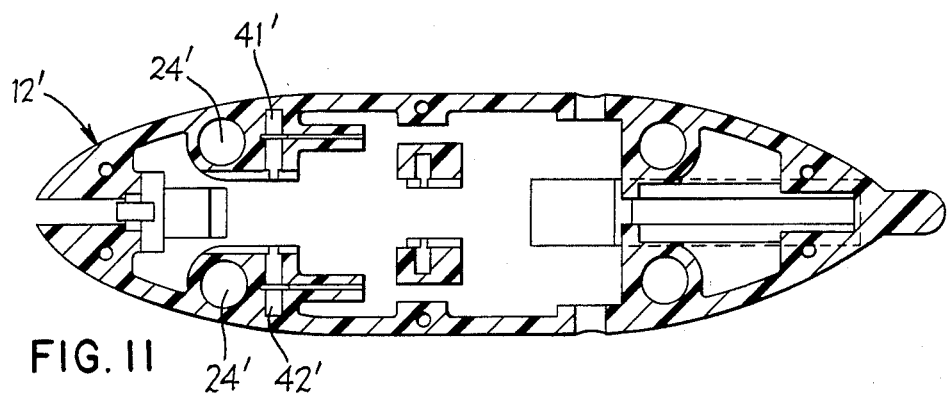

FISHING LURE WITH RETRACTABLE HOOK

FIELD OF THE INVENTION

This invention relates to a fishing lure and, more particularly, to a fishing lure having a hook part which moves from a retracted position to an exposed position when a fish strikes the lure.

BACKGROUND OF THE INVENTION

As is commonly known among fisherman, the technique of trolling typically involves the use of a lure which resembles a small fish or other living creature and which is pulled through the water below the surface thereof so as to simulate a swimming movement and thereby attract the attention of a larger fish which is to be caught. The lure, of course, has a hook which is intended to snag the large fish when it strikes the lure. A problem with such lures is that the lure often passes through aqueous weeds or other submerged obstructions, and the hook of the lure is snagged by the aqueous weeds or obstructions. Often it is difficult, time consuming and frustrating to disengage the submerged lure from the weed or obstruction, and sometimes the lure is so completely entangled that the force required to free it exceeds the strength of the fishing line, as a result of which the fishing line breaks and the lure is lost.

In an attempt to deal with this problem, lures have previously been designed in a manner so as to shield the hook from aqueous weeds and the like until such time as a fish strikes the lure. For example, lures of this general type are disclosed in U.S. Pat. Nos. 2,459,819, 3,060,619, 3,410,019, 3,665,634 and 4,274,220. However, although these preexisting lures have been adequate for their intended purposes, they have not been satisfactory in all respects. Often, they are relatively complex devices which are relatively expensive to manufacture.

Accordingly, it is an object of the present invention to provide a lure of the type described above which is relatively simple in structure and inexpensive to manufacture, yet which operates very dependably.

It is a further object of the invention to provide a lure, as aforesaid, which is durable and rugged, and will have a relatively long useful lifetime with little or no maintenance.

SUMMARY OF THE INVENTION

The objects and purposes of the invention, including those set forth above, are met by providing a lure which includes a pull member having a line attachment portion to which a fishing line can be attached, a body supported for pivotal movement relative to the pull member about a pivot axis, the body being urged to a first position relative to the pull member as the lure is drawn through water by forces attached to the line attachment portion and being capable of pivoting relative to the pull member to a second position when a fish strikes the lure, and a hook part and arrangement which effects movement of the hook part relative to the body from a retracted position to an exposed position in response to relative pivotal movement of the pull member and body from the first position to the second position. The hook part has an arrangement which prevents aqueous weeds from snagging the hook part when the hook part is in its retracted position, and the hook part is disposed outwardly of the body when in its exposed position so as to be capable of hooking a fish which has struck the lure.

BRIEF DESCRIPTION OF THE DRAWINGS

Three preferred embodiments of the invention will be described in detail hereinafter with reference to the accompanying drawings, in which:

FIGS. 9A-9F are respective sectional views of the lure of FIG. 1 taken along the respective section lines shown in FIG. 4;

FIG. 10 is a sectional top view similar to FIG. 3 of a second embodiment of the inventive fishing lure;

FIG. 11 is a view similar to FIG. 4 of a body half of the lure of FIG. 10;

DETAILED DESCRIPTION

Figure 1:
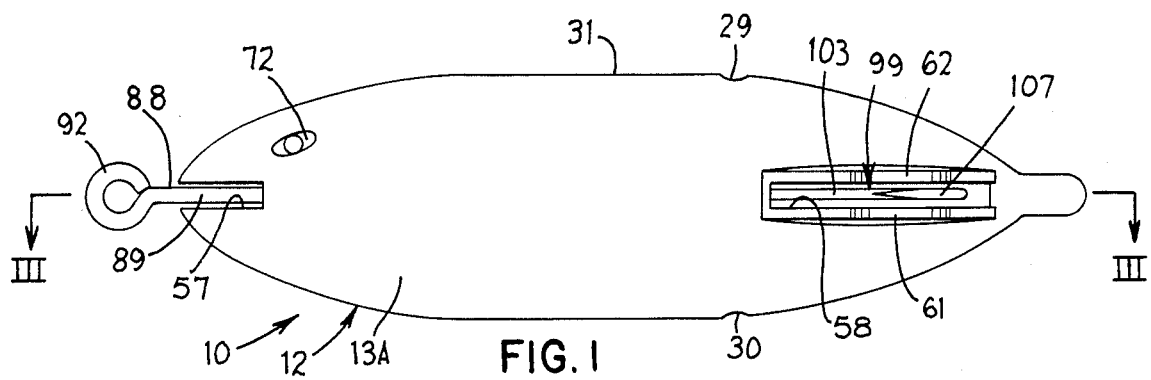
FIG. 1 is an elevational side view of a fishing lure embodying the present invention.
Figure 2:
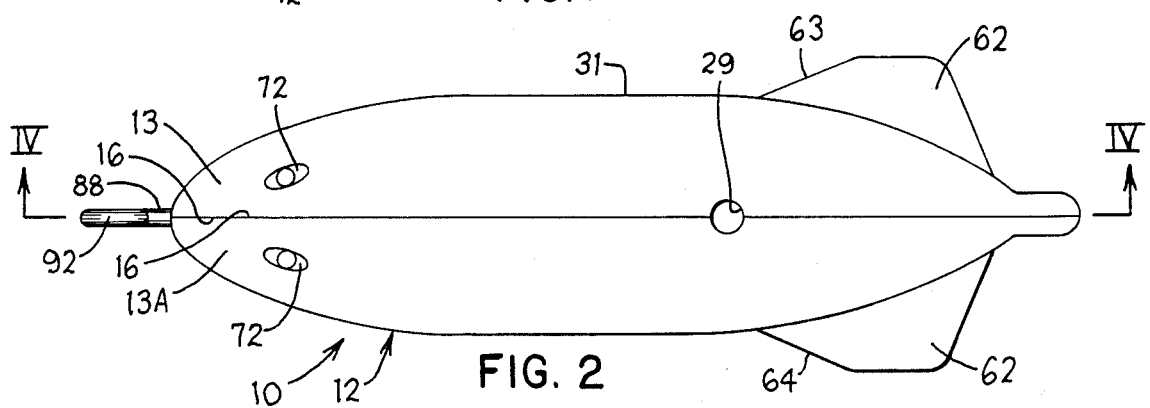
FIG. 2 is a top view of the lure of FIG. 1.

Referring to FIGS. 1-4 and 9A-9F, a first preferred embodiment of the inventive fishing lure 10 includes an elongate body 12 consisting of two identical halves 13 and 13A (FIG. 2) which are plastic injection molded parts and which are mirror images of each other. Since the halves 13 and 13A are identical, the same reference numerals are used to identify corresponding parts of each. The halves 13 and 13A each have thereon a planar surface 16, the surfaces 16 being disposed against each other and being fixedly secured to each other by an appropriate conventional adhesive such as a glue for plastics.

Figure 4:
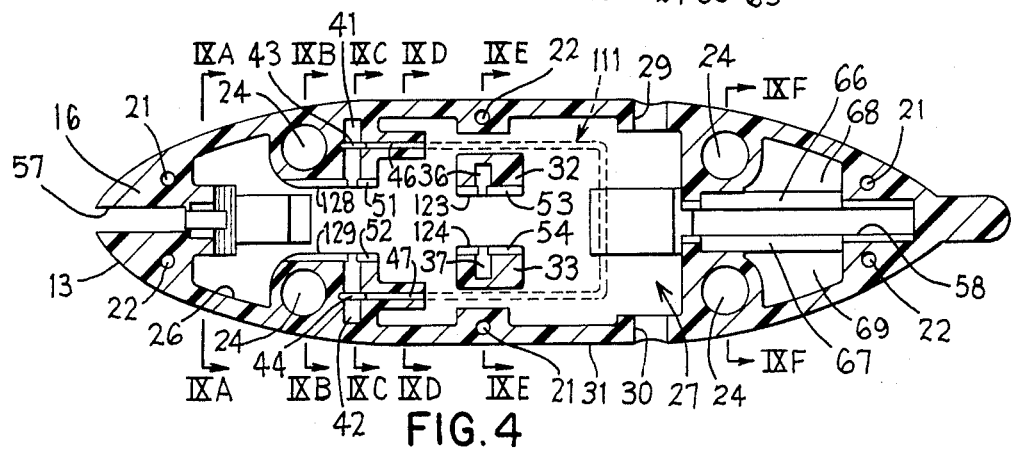
FIG. 4 is a side view taken along the line IV—IV in FIG. 2 of a body half which is a component of the lure of FIG. 1, other components being omitted for clarity.

Referring to FIG. 4, which shows only the half 13 of the body 12, the surface 16 has hatching thereon for purposes of clarity and because in the preferred embodiment it is permanently adhesively fixed to the surface 16 on the other half 13A of the body 12. As shown in FIGS. 4 and 9E, the body half 13 has three cylindrical pins 21 which project outwardly from the surface 16, and has three cylindrical holes 22 extending thereinto from the surface 16. When the two identical halves are assembled, each of the pins 21 extends into a respective one of the holes 22. The surface 16 also has four semispherical recesses 24 therein which, as shown in FIG. 9B, define four sealed spherical air cavities in the assembled lure. The air cavities provide sufficient buoyancy so that the lure will not sink directly to the bottom of a lake or stream, but not so much buoyancy that the lure is incapable of sinking below the surface of the water. Further, one or more small lead pellets (not illustrated) are preferably provided in the two lowermost air cavities when the lure is assembled in order to adjust the buoyancy and to keep the lure upright.

Referring to FIG. 4, the body half 13 has a relatively large recess 26 which is provided in the planar surface 16 and which, in the assembled lure, defines a large cavity 27 within the body 12 of the lure. The assembled lure has upper and lower cylindrical air holes 29 and 30 extending between the cavity 27 and an exterior surface 31 of the body 12, each of the air holes 29 and 30 being defined by two semicylindrical grooves provided in the surface 16.

The body half 13 has two spaced, parallel projections 32 and 33 (FIG. 4) which extend horizontally within the recess 26 and which have outer end surfaces coplanar with the surface 16. Thus, in the assembled lure, the outer end surface of the projection 32 on each of the body halves 13 and 13A is adhesively secured to the outer surface of the projection 33 on the other body half, as shown in FIG. 9E. The outer end surfaces of the projections 32 and 33 have therein respective semicylindrical recesses 36 and 37 which, as shown in FIG. 9E, define cylindrical recesses in the assembled lure. Further, the body half 13 has semicylindrical recesses 41 and 42 provided in the surface 16 on opposite sides of the recess 26, each having approximately in the axial center thereof a concentric semicircular groove. Further semicylindrical grooves 46 and 47 provided in the planar surface 16 open into the semicircular grooves 43 and 44. As shown in FIG. 9C, in the assembled lure the semicylindrical recesses 41 and 42 define cylindrical recesses, the semicircular grooves 43 and 44 define annular grooves, and as shown in FIG. 9D the semicylindrical grooves 46 and 47 define cylindrical openings.

As shown in FIGS. 4, 9A–9C and 9E, the body half 13 has cutouts provided along certain edges of the planar surface 16, for example as designated by reference numerals 51–54. The purpose of these cutouts will be discussed later.

As shown in FIG. 4, the body half 13 has two horizontally extending slots or elongate openings 57 and 58 in the exterior surface thereof which each communicate with the cavity 27 in the assembled lure. Two planar, spaced fins 61 and 62 are provided on opposite sides of the slot 58 and extend horizontally outwardly. The fins 61 and 62 have respective tapered leading edges 63 and 64, and have thereon a portion of the external surface 31 of the body 12. Reinforcing lips 66 and 67 which are respectively coplanar with the fins 61 and 62 extend a small distance into the recess 26 from respective portions 68 and 69 of the inner surface of the recess 26.

In the preferred embodiment, each of the halves 13 and 13A of the body has a respective eye 72 added thereon, for example by painting or by applying a suitable decal. Consequently, and in view of the fins 61 and 62 and the fact that the slot 57 resembles a mouth, the lure 10 resembles a small fish in order to enhance its appearance as a suitable meal to a larger fish which is to be caught.

Figure 3:
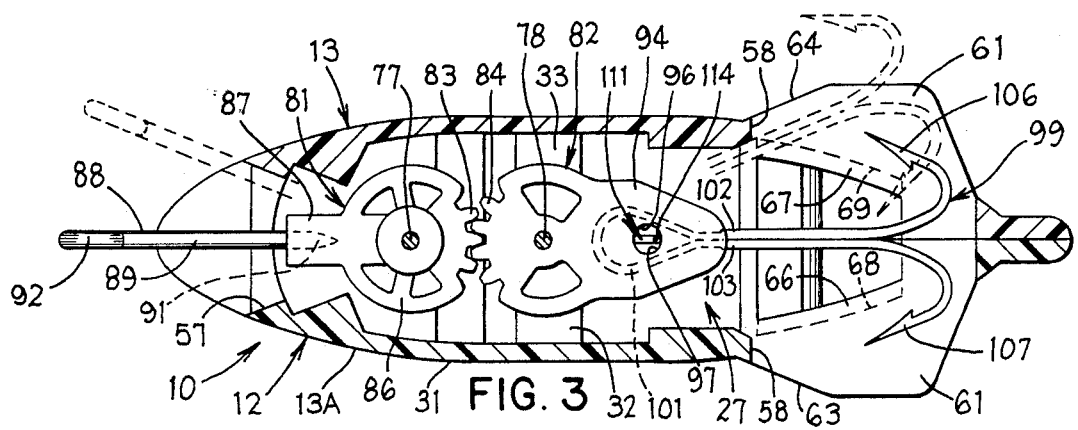
FIG. 3 is a sectional top view taken along the line III—III of FIG. 1.
Figure 5:
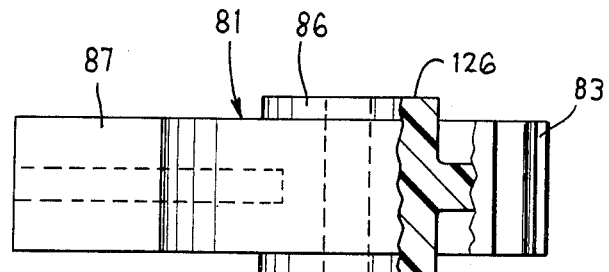
FIG. 5 is an elevational side view, partly in section, of a pull member which is a component of the lure of FIG. 1.
Figure 6:
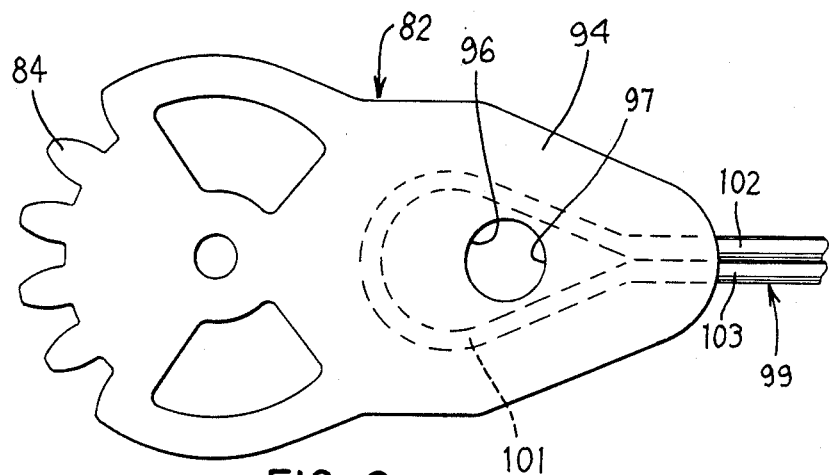
FIG. 6 is a fragmentary top view of a support member which is a component of the lure of FIG. 1.

Referring now to FIGS. 3 and 4, the lure 10 includes a vertical cylindrical axle 77 which has its ends disposed in the cylindrical recesses defined in the body 12 by the grooves 41 and 42. A further vertical cylindrical axle 78 has its ends disposed in the cylindrical recesses defined in the body 12 by the semicylindrical grooves 36 and 37. Referring to FIGS. 3 and 5, a pull member 81 is pivotally supported on the axle 77, and a support member 82 is pivotally supported on the axle 78, the members 81 and 82 each having several cooperating gear teeth 83 and 84 so that they pivot synchronously, as discussed hereinafter. The pull member 81 includes a gear member 86 having a radially outwardly projecting stub 87, and a screw member 88 which includes a shank 89 having a threaded end 91 screwed into a radially extending opening in the stub 87 and having a circular eye 92 (FIG. 1) at the opposite end thereof. The eye 92 serves as a line attachment portion to which a fishing line can be attached, for example as shown at 181″ in FIG. 14 for an alternative embodiment of the inventive lure. The support member 82 has a radial projection 94 which in turn has a cylindrical hole 96 extending therethrough parallel to and spaced radially from the axle 78. The cylindrical hole 96 has therein a semicylindrical surface 97 which faces the axle 78. An element 99 which is made from a piece of bent wire has an end 101 which is fixedly embedded in the projection 94 and which is formed in a teardrop-shaped loop. The cylindrical hole 96 extends through the loop 101, the sides of the loop 101 being close to the hole 96 but the left-most end of the loop 101 being spaced from the hole 96 by a distance which is slightly less than half the radial distance between the hole 96 and the axle 78. The bent wire element 99 has two adjacent and parallel legs 102 and 103 which extend radially outwardly from the projection 94 on the support member 82, and each has at an outer end thereof a respective barbed hook part 106 or 107 (FIG. 3).

Figure 8:
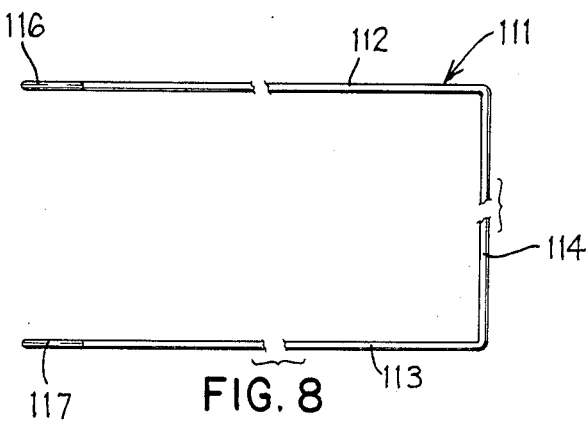
FIG. 8 is an elevational side view of a wire spring element which is a component of the lure of FIG. 1.
Figure 12:
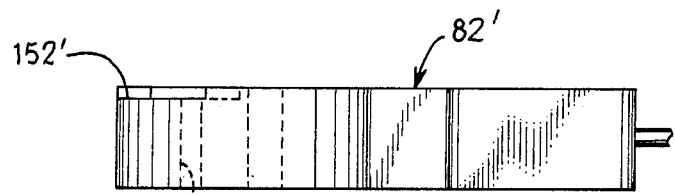
FIG. 12 is an elevational side view of a support member which is a component of the lure of FIG. 10.

Referring to FIG. 8, a U-shaped wire spring element 111 includes two spaced and parallel legs 112 and 113 which are connected by a bight 114 and which are each bent at the end thereof remote from the bight 114 into a respective circular loop 116 or 117. Referring to FIGS. 3 and 4, in the assembled lure 10 the loops 116 and 117 of the spring element 111 each encircle a respective end of the axle 77 and are disposed in the annular grooves defined by the semicircular grooves 43 and 44, and the portions of the legs 112 and 113 adjacent the loops 116 and 117 are disposed in the openings defined by the semicylindrical grooves 46 and 47. Consequently, the ends of the legs 112 and 113 remote from the bight 114 are fixedly secured to the body 12. The bight 114 extends through and has a cross-sectional size substantially less than that of the cylindrical opening 96 through the support member 82. The diameter of the hole 96 is such that one of the loops 116 and 117 can be inserted therethrough during assembly, and the length of the legs 112 and 113 is such that the bight 114 is lightly pressed against the semicylindrical surface 97 in the hole 96 when the support member 82 is in the position shown in FIG. 3. As the support member 82 pivots about the axle 78, the bight 114 slides on the semicylindrical surface 97 and also moves transversely within the lure through flexing of the legs 112 and 113. The resilience of the legs 112 and 113 urges the bight 114 back to the center position which is shown in FIG. 3, the bight 114 in turn urging the support member 82 back to the center position which is shown in FIG. 3.

Figure 7:
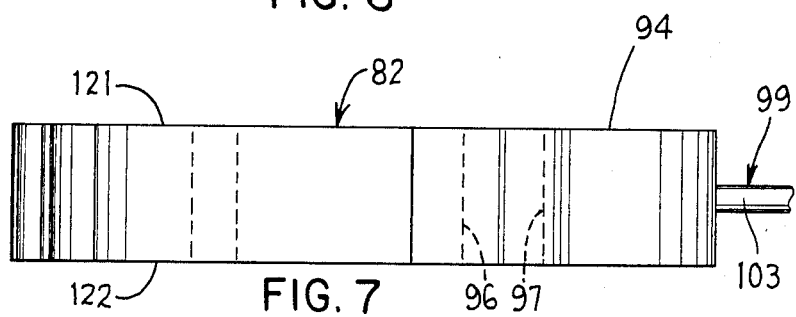
FIG. 7 is a fragmentary side view of the support member of FIG. 6.

The opposite axial ends 121 and 122 (FIG. 7) of the support member 82 are slidably disposed against planar surfaces provided at 123 and 124 (FIG. 4) on the projections 32 and 33, and the opposite axial end surfaces 126 and 127 (FIG. 5) of the pull member 81 are slidably disposed against planar surfaces provided at 128 and 129 (FIG. 4). The cutouts 51–54 which were discussed above ensure that the adhesively secured planar surfaces 16 on the halves 13 and 13A are spaced slightly from the pull member 81 and the support member 82, so that in the event a small amount of glue oozes out from between the surfaces 16 it will be disposed within the cutouts 51–54 and will not directly engage the pull member 81 or support member 82, thereby ensuring that the pull member 81 and support member 82 do not become glued in a fixed angular position during assembly and thus render the lure inoperative.

Turning now to FIGS. 10–13, the fishing lure 10' illustrated therein is an alternative embodiment of the lure 10 discussed above. The lure 10' is structurally similar in many respects to the lure 10 of FIG. 1. Therefore, equivalent parts are designated with similar reference numerals and, in order to avoid redundancy, structural similarities are not described in detail. Instead, only the important structural differences are described in detail.

More specifically, referring to FIG. 10, the members 81' and 82' pivotally supported on the axles 77' and 78' do not have cooperating gear teeth. Instead, each has in the upper side thereof a shallow recess which has at the bottom thereof a respective upwardly facing planar surface 151 or 152. Extending into each of the members 81' and 82' from the respective surface 151' or 152' is a respective cylindrical hole 156' or 157' which is radially spaced from and parallel to each of the axles 77' and 78'. A U-shaped link element 161' which is made from a piece of bent wire has a bight 163' (FIGS. 10 and 13) and two parallel spaced legs 166 and 167 which extend downwardly from opposite ends of the horizontal bight 163'. The leg 166' is rotatably disposed in the cylindrical hole 156', and the leg 167' is rotatably disposed in the cylindrical hole 157'. The bight 163' extends tangentially of the path of movement of the hole 156' about the axle 77' and extends tangentially of the path of movement of the hole 157' about the axle 78'. Thus, the members 81' and 82' pivot synchronously about the axles 77' and 78'.

Referring to FIG. 11, the semicylindrical grooves 41' and 42' have been shifted forwardly (leftwardly in the figure) a small distance in comparison to their counterparts 41 and 42 in the embodiment of FIG. 3, and the two semispherical recesses 24' adjacent thereto have also been shifted forwardly a small distance in comparison to their counterparts 24 of FIG. 3.

Figure 14:
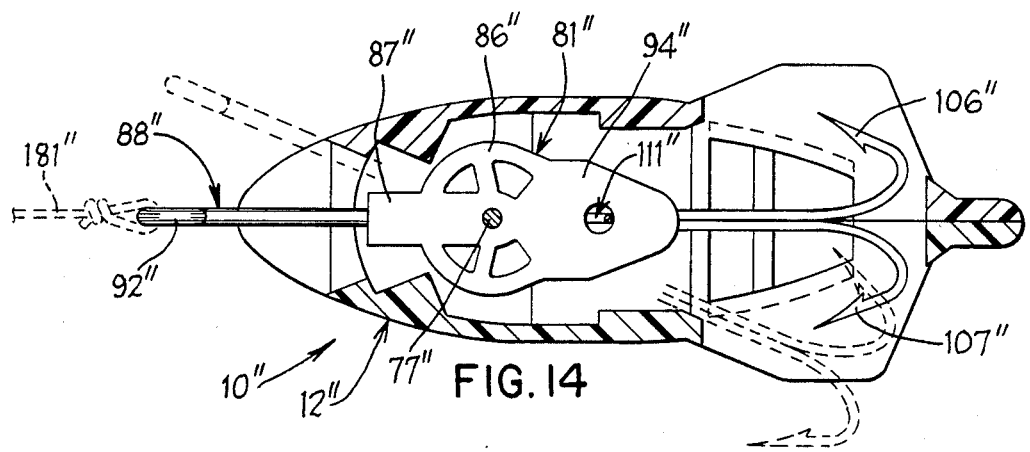
FIG. 14 is a sectional top view similar to FIG. 3 of a third embodiment of the inventive fishing lure.

Turning now to FIG. 14, a further lure 10" which embodies the present invention is illustrated. Structural features equivalent to features of the embodiment of FIG. 1 are designated with similar reference numerals and, in order to avoid redundancy, are not described again in detail here. Only the differences are described.

More specifically, the body 12" has been shortened somewhat in its central region in comparison to the body 12' of FIG. 3, and does not include projections equivalent to the projections 32 and 33 shown in FIG. 4 or the axle 78 supported by the projections. Further, there is not a separate support member equivalent to the support member 82 of FIG. 3. Instead, the pull member 81" in the embodiment of FIG. 14 has directly provided thereon the radially extending projection 94" which supports the element 99" having the hook parts 106" and 107" thereon.

Figure 15:
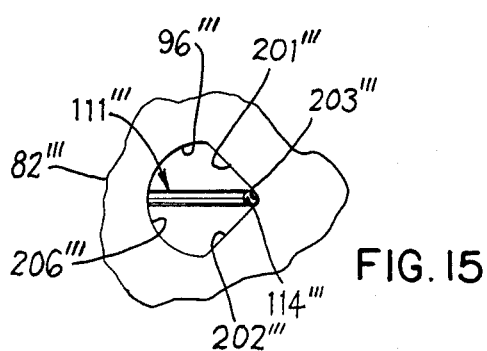
FIG. 15 is a fragmentary top view of part of an alternative embodiment of a support member which is a component of the embodiment of FIG. 1.

FIG. 15 is a fragmentary top view of an alternative embodiment of the support member 82 of FIG. 1. In particular, the hole 96''' through the support member 82''' of FIG. 15 is not cylindrical. Instead, it has two planar surfaces 201''' and 202''' which extend perpendicular to each other, which at their adjacent ends merge into respective ends of an approximately semicylindrical surface 203''' having a small radius, and which at their outer ends merge into respective ends of an approximately semicylindrical surface 206''' having a larger radius. As the support member 82''' pivots away from its center position, the bight 114''' of the spring element 111''' slides from the semicylindrical surface 203''' onto one of the planar surfaces 201''' and 202''' while flexing the legs of the spring element, so that the spring element yieldably urges the support member back to the center position shown in FIG. 15, in which the bight 114''' is closely adjacent or lightly pressed against the semicylindrical surface 203'''.

Figure 13:
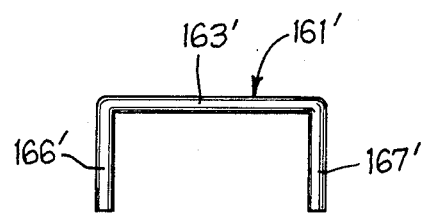
FIG. 13 is an elevational side view of a link element which is a component of the lure of FIG. 10.

With reference to the link element 161' of FIGS. 10 and 13, it would be possible to put a radially outwardly extending pin at the lower end of each leg 166' and 167' and to put an axially extending groove in the surface of each of the openings 156' and 157' in the pull member 81' and support member 82'. During assembly, the radially extending pins would slide in the grooves until they are located just below the bottom surfaces of the pull member 81' and support member 82', and would be angularly offset from the grooves in the assembled lure shown in FIG. 10, thus positively preventing disengagement of the legs 166' and 167' from the openings 156' and 157' due to upward movement of the link element 161'.

OPERATION

Referring to FIG. 3, when a fishing line attached to the line attachment eye 92 applies a force thereto in a forward direction (leftward in the drawings) so as to draw the lure 10 through the water, the water flowing over the external surface 31 of the body 12 urges the body 12 to pivot relative to the pull member 81 to the position which is shown in solid lines in FIG. 3, which due to the cooperating gear teeth 83 and 84 also causes the support member 82 to be positioned as shown in solid lines in FIG. 3. The spring element 111 also urges the support member 82, pull member 81 and body 12 toward the relative positions shown in FIG. 3. When these parts are thusly positioned, the hook parts 106 and 107 are each in a retracted position disposed within the cavity 27 in body 12, and the fins 61 and 62 having the tapered leading edges 63 and 64 prevent aqueous weeds and the like from snagging the hook parts 106 and 107 as the lure 10 moves therepast.

When a fish strikes the lure and attempts to swim away with the lure in its mouth, the pull member 81 will pivot relative to the body 12, for example clockwise so that the screw member 88 thereof is moved to the position shown in broken lines in FIG. 3. The cooperating gear teeth 83 and 84, of course, simultaneously cause the support member 82 to pivot in the opposite direction so that the hook part 106 moves from the retracted position shown in solid lines to the exposed position shown in broken lines, in which it projects outwardly beyond the body 12 and can snag the mouth of the fish. As this pivotal movement of the support member 82 takes place, the bight 114 of the spring element 111 slides on the semicylindrical surface 97 of the support member 82 and is also shifted a small distance transversely (upwardly in FIG. 3) through flexing of the legs 112 and 113.

Alternatively, the movement of the fish may cause the pull member 81 to pivot in a counterclockwise direction from the position shown in solid lines in FIG. 3, thereby causing the hook part 107 to move transversely (downwardly in FIG. 3) from the retracted position shown in solid lines to an exposed position symmetrically corresponding to the exposed position of the hook 106 which is shown in broken lines.

The alternative embodiments of FIGS. 10, 14 and 15 operate in a similar manner, and a detailed discussion of the operation thereof is believed unnecessary.

Although three preferred embodiments of the inventive lure have been disclosed in detail for illustrative purposes, it will be recognized that variations or modifications of the disclosed lures, including the rearrangement of parts, lie within the scope of the present invention.

The embodiments of the invention in which an exclusive property or privilege is claimed are defined as follows:

1. A fishing lure for trolling, comprising: a pull member having a line attachment portion to which a fishing line can be attached; a body supported for pivotal movement relative to said pull member about a pivot axis between first and second positions, said line attachment portion being spaced radially from said pivot axis; means for yieldably retaining said body in said first position with respect to said pull member as said lure is drawn through water by forces applied to said line attachment portion, wherein said body can pivot relative to said pull member about said pivot axis from said first position to said second position when a fish strikes said lure; and a hook part and means for effecting movement of said hook part relative to said body between a retracted position and an exposed position in response to relative pivotal movement of said pull member and said body between said first and second positions, respectively, said body having means for preventing aqueous weeds from snagging said hook part when said hook part is in said retracted position, and wherein said hook part is disposed outwardly of said body when in said exposed position so as to be capable of hooking a fish striking said lure.

2. The lure of claim 1, wherein said means for effecting movement of said hook part includes a support member which is supported on said body for pivotal movement relative thereto about a further pivot axis which is parallel to and spaced from said first-mentioned pivot axis, said hook part being fixedly supported on said support member, and includes means responsive to pivotal movement of said pull member between its first and second positions for pivoting said support member so that said hook part moves between its retracted position and exposed position, respectively.

3. The fishing lure of claim 2, wherein said means responsive to said pull member for pivoting said support member includes said pull member and support member each having gear teeth thereon, said gear teeth on said pull member drivingly engaging said gear teeth on said support member.

4. The fishing lure of claim 2, wherein said means responsive to said pull member for pivoting said support member includes said pull member having therein a hole which is spaced radially from and is parallel to said first-mentioned pivot axis, includes said support member having therein a hole which is spaced radially from and is parallel to said further pivot axis, and includes a U-shaped link element having two spaced, parallel legs connected by a bight, each of said legs of said link element being rotatably received in a respective one of said holes in said pull member and said support member.

5. The fishing lure of claim 2, wherein said means for yieldably maintaining said body and said pull member in said first position includes resilient means for yieldably urging relative movement of said body and said pull member toward said first position.

6. The fishing lure of claim 5, wherein said support member has therethrough a hole which extends parallel to and is spaced radially from said further pivot axis, and wherein said resilient means includes a U-shaped spring element having two legs connected by a bight, said bight extending through and having a cross-sectional size substantially less than that of said hole through said support member and slidably engaging a surface provided in said hole on a side thereof remote from said further pivot axis, and said legs each extending away from said bight in a direction toward said further pivot axis and each having an end remote from said bight which is fixedly supported on said body.

7. The fishing lure of claim 2, wherein said means for preventing said hook part from snagging aqueous weeds includes said body having an opening in an external surface thereof and having a cavity therein which communicates with said opening, said pull member and said support member being disposed substantially within said cavity, and said hook part moving through said opening into said cavity as it moves from its exposed position to its retracted position and being disposed within said cavity in said retracted position.

8. The fishing lure of claim 7, including an elongate opening provided in said body and communicating with said cavity, and wherein said pull member includes a radially extending shank portion which extends outwardly through said elongate opening and which has at an outer end thereof an eye, said eye being said line attachment portion.

9. The fishing lure of claim 1, wherein said body and pull member can pivot relative to each other about said first-mentioned axis to a third position, said body and said pull member passing through said first position as they pivot from said second position to said third position, and including a further hook part and means for effecting movement of said further hook part between a retracted position and an exposed position as said pull member and body move between said first position thereof and said third position thereof, respectively, said body having means for preventing aqueous weeds from snagging said further hook part when said further hook part is in said retracted position, and wherein said further hook part is disposed outwardly of said body when in said exposed position so as to be capable of hooking a fish striking said lure.

10. The fishing lure of claim 1, wherein said means for yieldably maintaining said body and said pull member in said first position includes resilient means for yieldably urging relative movement of said body and said pull member toward said first position.

11. The fishing lure of claim 1, wherein said means for effecting movement of said hook part includes said hook part being fixedly supported on said pull member.

12. The fishing lure of claim 11, wherein said pull member has therethrough a hole which extends parallel to and is spaced radially from said pivot axis, and wherein said means for yieldably retaining said body and said pull member in said first position includes a U-shaped spring element having two legs connected by a bight, said bight extending through and having a cross-sectional size substantially less than that of said hole through said support member and slidably engaging a surface provided in said hole on a side thereof remote from said pivot axis, and said legs each extending away from said bight in a direction toward said pivot axis and each having an end remote from said bight which is fixedly supported on said body.

13. The fishing lure of claim 11, wherein said means for preventing said hook part from snagging aqueous weeds includes said body having an opening in an external surface thereof and having a cavity therein which communicates with said opening, said pull member and said support member being disposed substantially within said cavity, and said hook part moving through said opening into said cavity as it moves from its exposed position to its retracted position and being disposed within said cavity in said retracted position.

14. The fishing lure of claim 13, including an elongate opening provided in said body and communicating with said cavity, and wherein said pull member includes a radially extending shank portion which extends outwardly through said elongate opening and which has at an outer end thereof an eye, said eye being said line attachment portion.

15. The fishing lure of claim 14, wherein said body and pull member can pivot relative to each other about said first-mentioned axis to a third position, said body and said pull member passing through said first position as they pivot from said second position to said third position, and including a further hook part and means for effecting movement of said further hook part between a retracted position and an exposed position as said pull member and body move between said first position thereof and said third position thereof, respectively, said body having means for preventing aqueous weeds from snagging said further hook part when said further hook part is in said retracted position, and wherein said further hook part is disposed outwardly of said body when in said exposed position so as to be capable of hooking a fish striking said lure.

* * * * *